(12) United States Patent
Yim et al.

(10) Patent No.: US 6,603,281 B2
(45) Date of Patent: Aug. 5, 2003

(54) HIGH MECHANICAL ADVANTAGE RATCHETING APPARATUS

(75) Inventors: Mark H. Yim, Palo Alto, CA (US); David G. Duff, Woodside, CA (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/945,004

(22) Filed: Aug. 31, 2001

(65) Prior Publication Data

US 2002/0043950 A1 Apr. 18, 2002

Related U.S. Application Data

(60) Provisional application No. 60/240,696, filed on Oct. 16, 2000.

(51) Int. Cl.[7] .............................................. G05B 11/01
(52) U.S. Cl. .......................... 318/560; 318/3; 318/139; 318/254; 318/280; 318/567; 318/568.11; 318/568.12; 318/568.14; 318/568.15; 318/568.17
(58) Field of Search ................................. 318/560, 139, 318/254, 3, 587, 567, 41, 594, 445, 280, 568.11–568.12, 568.14–568.17; 701/36, 2; 446/91; 228/45; 700/263, 261; 74/490.01; 901/28

(56) References Cited

U.S. PATENT DOCUMENTS

| 4,107,948 A | * | 8/1978 | Molaug | 414/7 |
| 5,293,107 A | * | 3/1994 | Akeel | 310/83 |
| 5,523,662 A |  | 6/1996 | Goldenberg et al. | 318/568 |
| 5,654,614 A | * | 8/1997 | Fluckiger et al. | 101/71 |
| 6,084,373 A | * | 7/2000 | Goldenberg et al. | 318/568.11 |

OTHER PUBLICATIONS

Chirikjian, G.S. et al., "Kinematics of Hyper–Redundant Robot Locomotion" IEEE Transactions on Robotics and Automation, New York, U.S., Dec. 1995, vol. 1, No. 6, pp. 781–793.*

Chirikjian, G.S. et al., "The Kinematics of Hyper–Redundant Robot Locomotion" IEEE Transactions on Robotics and Automation, New York, US, Dec. 1995, vol. 1, No. 6, pp. 781–793.

Yim, M. et al., "PolyBot: A Modular Reconfigurable Robot", Proc. 2000 IEEE International Conference on Robotics and Automation, San Francisco, CA, USA, Apr. 2000, pp. 514–520.

* cited by examiner

*Primary Examiner*—Robert E. Nappi
*Assistant Examiner*—Renata McCloud
(74) *Attorney, Agent, or Firm*—Linda M. Robb

(57) ABSTRACT

A controllable ratcheting apparatus having robotic modules rigidly attached for operation near a mechanical singularity includes a plurality of modular joints and ratcheting means. Each one of the modular joints is capable of locking and unlocking to effect performance of a ratcheting motion as the ratcheting apparatus approaches a mechanical singularity. A plurality of links is connected to the modular joints in such a way as to permit movement of the links while under large external forces as the joint approaches a point of mechanical singularity. A control system directs movement of the modular joints and links.

22 Claims, 5 Drawing Sheets

HIGH MECHANICAL ADVANTAGE RATCHETING APPARATUS

This application is based on a Provisional Patent Application No. 60/240,696, filed Oct. 16, 2000. +gi This work was funded in part by the Defense Advanced Research Projects Agency (DARPA), Contract #MDA972-98-C-0009. The U.S. Government may have certain rights in this invention.

INCORPORATION BY REFERENCE

The following U.S. patents are fully incorporated herein by reference: U.S. Pat. No. 5,523,662 to Goldenberg et al. ("Modular, Expandable and Reconfigurable Robot") and U.S. Pat. No. 5,293,107 to Akeel ("Motorized Rotary Joint and Method of Constructing a Modular Robot Utilizing Same").

BACKGROUND OF THE INVENTION

The present invention relates to modular, expandable and reconfigurable closed chain robotic systems and more particularly to self-locking or ratcheting joints for such systems.

Modular robotic systems are systems which contain many repeated modules having actuators, sensors and computational elements. These modules may be disconnected and reconnected in different arrangements to form a new system enabling new functionalities. There have been a variety of modular reconfigurable systems as there are many aspects of robot systems that can be modular and reconfigurable. These include manual reconfiguration, in which an operator reconfigures the modules, and automatic reconfiguration, in which the robot reconfigures itself or another machine reconfigures the modules. These systems may contain homogeneous or heterogeneous modules.

Modular self-reconfigurable robot systems can also reconfigure or rearrange their own modules. These systems may have many desirable properties, such as versatility (resulting from many possible configurations), robustness (through redundancy and self-repair) and low cost (through batch fabrication). However, one problem with these systems has been the limits of performance of individual actuators within the systems.

Long serial chain robots with many degrees of freedom (DOF), or hyper-redundant robot arms have a variety of applications including inspection robot arms and snake-like locomotion for planetary exploration or search and rescue. Some modular, reconfigurable systems that use many repeated modules use long serial chains as parts of a larger system, much like the tentacles of an octopus. One problem with using serial chains is limited actuation capabilities. Since the number of modules within a chain is variable, the actuation strength required to maneuver the chain varies, and at some point there will be more modules than the system's actuators' limits can support. A closed chain is a serial chain with both ends attached to form a loop. Closed chains can resemble long serial chains by flattening the loop.

Typically, in robot arm control, configurations which correspond to singularities in the Jacobian matrix, which describes the ratio of joint velocities of joints in joint space to the velocities of joints in Cartesian space or other work oriented space, are typically avoided to prevent excessive joint velocities or torques. Redundant manipulators have sometimes used the extra DOF to enhance this avoidance. However, in remaining close to such singularities, it is possible to exploit the near infinite mechanical advantage available at the singularity.

Human beings exploit singularities in their walking movement. In taking a forward step, the heel makes contact with the ground and the leg straightens as it begins to take on the weight of the body. When the leg is straight the Jacobian matrix describing the relationship between the joints (hip and knee) and the Cartesian position of the foot becomes singular. Also, the mechanical advantage of the system increases. As the knee approaches straightness, the force that the hamstring muscles can apply parallel to the direction of the leg increases. The effort on the muscles (and thus the amount of energy expended) is correspondingly reduced by the large mechanical advantage.

Similarly, it is possible to obtain large variable mechanical advantage for closed chain serial manipulators with rotational degrees of freedom. Such systems are characterized as having redundancy, which provides additional degrees of freedom, parallelism or closed chain configuration, and at least one configuration where the Jacobean is singular. One additional requirement for this system is a form of lock or brake, which enables the degree of freedom to be made rigid independently of the strength of the actuator. This may be an additional active brake, or a self-locking or non-backdrivable actuator.

Various approaches have employed mechanical advantage to achieve movement. An example of a system that utilizes a fixed mechanical advantage combined with ratcheting is similar to an older style car jack. This device is used to lift a car up by pushing a lever down, thereby lifting the car a small amount and then locking the position so that the motion can be repeated while gaining height. The ratio of the lengths of the lever on each side of the fulcrum determines its fixed mechanical advantage.

Another approach is a closed chain, for example a four bar linkage. In four bar linkages, the device enters a singularity at "toggle points", where three of the joints of the fourbar linkage become collinear so the driving actuator obtains infinite mechanical advantage. This characteristic has frequently been exploited for achieving large forces for things such as clamping devices. However, motions near the toggle point result in very small motions at the point of applied force, which is the reason for enhanced leverage at that point. The leverage is variable depending on how close the system is to the toggle point, theoretically up to infinity.

Increased motion can be achieved by combining the two approaches, ratcheting and variable mechanical advantage with multiple closed chains repeating motions and switching locked joints resulting in a ratcheting action. For very large mechanical advantage, and thus very small motions, the number of motions that must be repeated can be very large. A manual device, such as a hand crank, would not be convenient for such an application, but an automatic device could make very rapid motions and lock switches as necessary to achieve the desired mechanical advantage.

Although useful, the above do not provide the capability of reconfiguring themselves to apply force to an object. An example of such an application is fire and earthquake search and rescue operations, which typically involve collapsed structures with voids and channels formed by the rubble. Very often the topography of the spaces inside these areas are dynamically changing due to further collapse, burning or aftershocks. Typically, a fire fighter must put himself at risk to enter such areas, assuming he can reach them. A device that is capable of a variety of modes of locomotion, whether it is squeezing through holes, or rapidly rolling down hills, or climbing into ducts would be extremely useful not only in reaching areas that humans cannot, but also in reducing the risk to human lives.

In the above application, the system allows the dangerous mission to be performed with minimal risk to people by performing the action at a removed distance. In addition to remote operations, the system can be used to perform functions otherwise dangerous or impossible for human personnel. For example, in a collapsed building it could turn off gas mains and fuses inside the building. This is particularly important in industrial plants in order to shut down operations in areas not accessible by humans due to chemical, fire, or radiation leaks. Here the reconfigurability and versatility of systems of robotic modules are key advantages.

The following disclosures may be relevant and/or helpful in providing an understanding of some aspects of the present invention:

U.S. Pat. No. 5,523,662 to Goldenberg et al., titled "Modular, Expandable and Reconfigurable Robot", discloses a robotic system including a robot having at least two manipulators, each having several compact rotary joints. The rotary joints have one input coupling and either one or two output couplings. Each joint is modular including a d.c. brushless motor coupled with a harmonic cup drive and includes position, velocity and torque sensors. Each manipulator may be disassembled and reassembled to assume a multitude of configurations. The modular robot is controlled by an expandable and modular real-time computer control system.

U.S. Pat. No. 5,293,107 to Akeel, titled "Motorized Rotary Joint and Method of Constructing a Modular Robot Utilizing Same", discloses a motorized rotary joint for robots which integrates a joint bearing with a power transmission, such as a planetary type speed reducer. A large central hole permits passing electric and service lines therethrough. The rotary joint includes a built-in rotor and stator arrangement within the same joint housing structure, thus allowing the electric motor to share the same bearing and housing structure with the speed reducer. Preferably, the rotor also carries planets of the reducer and the stator is either integral or coupled to a housing of the reducer. The rotary joint also accommodates an encoder, a circuit board having electronic components thereon and a built-in brake to provide a totally integrated, intelligent rotary joint.

SUMMARY OF THE INVENTION

In accordance with one aspect of the present invention, a ratcheting system includes a plurality of modular joints, a plurality of links connected to the modular joints, and a ratcheting device. A control system directs movement of the modular joints and linkages.

In accordance with another aspect of the invention, a controllable ratcheting apparatus operated near a mechanical singularity includes a plurality of modular joints with a plurality of links movably connected to the joints and a ratcheting device. A control system controls movement of the modular joints and their associated links.

In yet another aspect of the invention, there is provided a method for controlling a ratcheting apparatus having a plurality of modular joints, a plurality of links connected to the modular joints, a ratcheting device and a control system. The plurality of joint is configured to form a closed chain. After all of the joints in the closed chain are locked, a first set of joints is unlocked and moved away from a mechanical singularity. At least one of the set of unlocked joints is then locked, and another set of joints is unlocked and moved from a mechanical singularity. The sequence of locking and unlocking selected sets of joints and moving the unlocked joints away from a mechanical singularity is repeated until a desired movement is obtained.

BRIEF DESCRIPTION OF THE DRAWINGS

Other features of the present invention will become apparent as the following description proceeds and upon reference to the drawings, in which.

All references cited in this specification, and their references, are incorporated by reference herein where appropriate for teaching additional or alternative details, features, and/or technical background.

DETAILED DESCRIPTION OF THE INVENTION

The modular, expandable and reconfigurable robotic system disclosed herein comprises modules that may be assembled to assume a multitude of configurations. The modules are instrumented with actuators and sensors as required for specific applications, with the modular system monitored and controlled by a computer controller capable of high computational throughput, a rapid sampling period, a high speed digital and analog I/O, a friendly user interface, a real time control system, and a modular and expandable structure.

Figure 1:
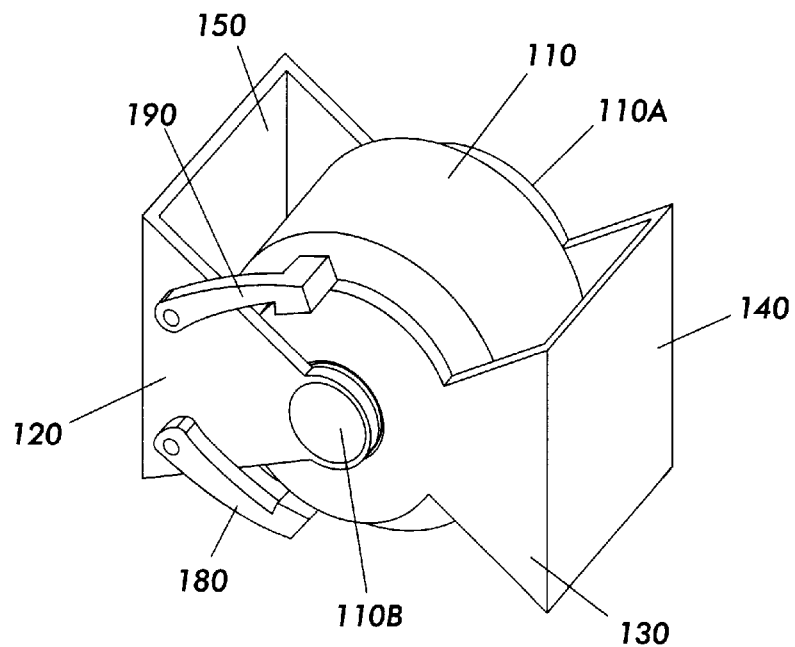
FIG. 1 is one embodiment of a robotic module according to the present invention.

In the ensuing description of the modular, expandable and reconfigurable robot system, like numerals refer to like parts. Referring to FIG. 1, a robotic module with integrated controllable active brake ratcheting mechanism includes a drive device 110, for example a motor, with a housing 110A and an output shaft 110B. A structure 130 with a connection plate 140 is rigidly attached to the housing 110A and a similar structure 120 with identical mating connection plate 150 is rigidly attached to the output shaft 110B. The motion of the structures 120 and 130 relative to each other is thus rotational about the axis of the motor. An active brake 190, is controllably attached to structure 120 such that the active brake will come into frictional contact with the housing structure 110A when a controller actuates the brake. When active brake 190 is engaged to frictionally contact housing structure 110A, the structure is locked from motion.

Alternatively, a system which has a non-backdriveable or self-locking transmission, such as a system utilizing worm drives or a system characterized by very high gear ratios, whose structure will only move when the actuator is commanded to move, can be used in place of the active brake. In these systems the structure is effectively locked at all times unless the system explicitly controls the structure to move.

Figure 2:
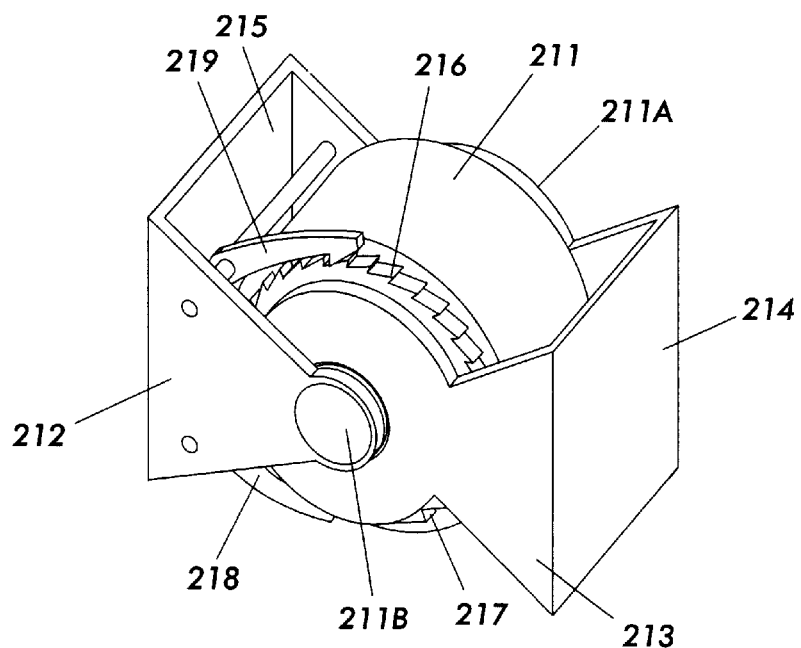
FIG. 2 is another embodiment of the robotic module according to the present invention.

Referring now to FIG. 2 there is shown another embodiment of the robotic module according to the instant invention. In this embodiment a robotic module with integrated controllable ratcheting mechanism includes an actuator 211, for example a motor, with a housing 211A and an output shaft 211B. A structure 213 with a connection plate 214 is rigidly attached to the housing 211A and a similar structure 212 with identical mating connection plate 215 is rigidly attached to the output shaft 211B. The motion of the structures 212 and 213 relative to each other is thus rotational about the axis of the motor. A pawl, 219, is controllably attached to structure 212 such that the pawl can be controllably engaged to catch on the saw teeth 216 which are rigidly attached to the housing structure 211A when the structure 212 is rotated in one direction but not the other. An identical pawl 218 is attached on an opposing symmetric side of structure 212 such that it catches on saw teeth 217 in the same manner but applied to rotations in the opposite sense. When both pawl 219 and pawl 218 are engaged to catch teeth 216 and 217, the structure is locked from motion, and when neither is engaged the structures are free to rotate in either direction.

Although FIGS. 1 and 2 illustrate a ratcheting action resulting from an active brake system and a pawl catching on saw teeth, it is understood that the ratcheting action could also employ a roller-clutch ratcheting system, also called a roller ratcheting system, a stepless ratcheting system, or other means of performing ratcheting like motion.

A system may be composed of the robotic modules rigidly attached to one another. In such a system, each module has one or more rotational degrees of freedom and each degree of freedom can be actuated as well as being selectively, directionally braked to prevent movement in one or more directions. For example, modules may be attached such that parts of them form open or closed chains. In particular, closed chains can be formed that have more than one degree of freedom. By moving the closed chain and locking some joints such that its motion is close to a toggle point or singularity, a large mechanical advantage can be obtained. The system may also contain other elements such as rigid linkages which form structures in the chains.

The theoretically near infinite mechanical advantage obtained when systems approach a singularity is exploited by repeatedly switching a subset of the motors to be active and the rest locked, a ratcheting type of action can be used to move links to positions while under large external forces. The size of each ratchet motion can be made arbitrarily small and thus arbitrarily close to the singularity with arbitrarily large mechanical advantage. Thus weak motors can be used to provide arbitrarily large forces.

Figure 3:
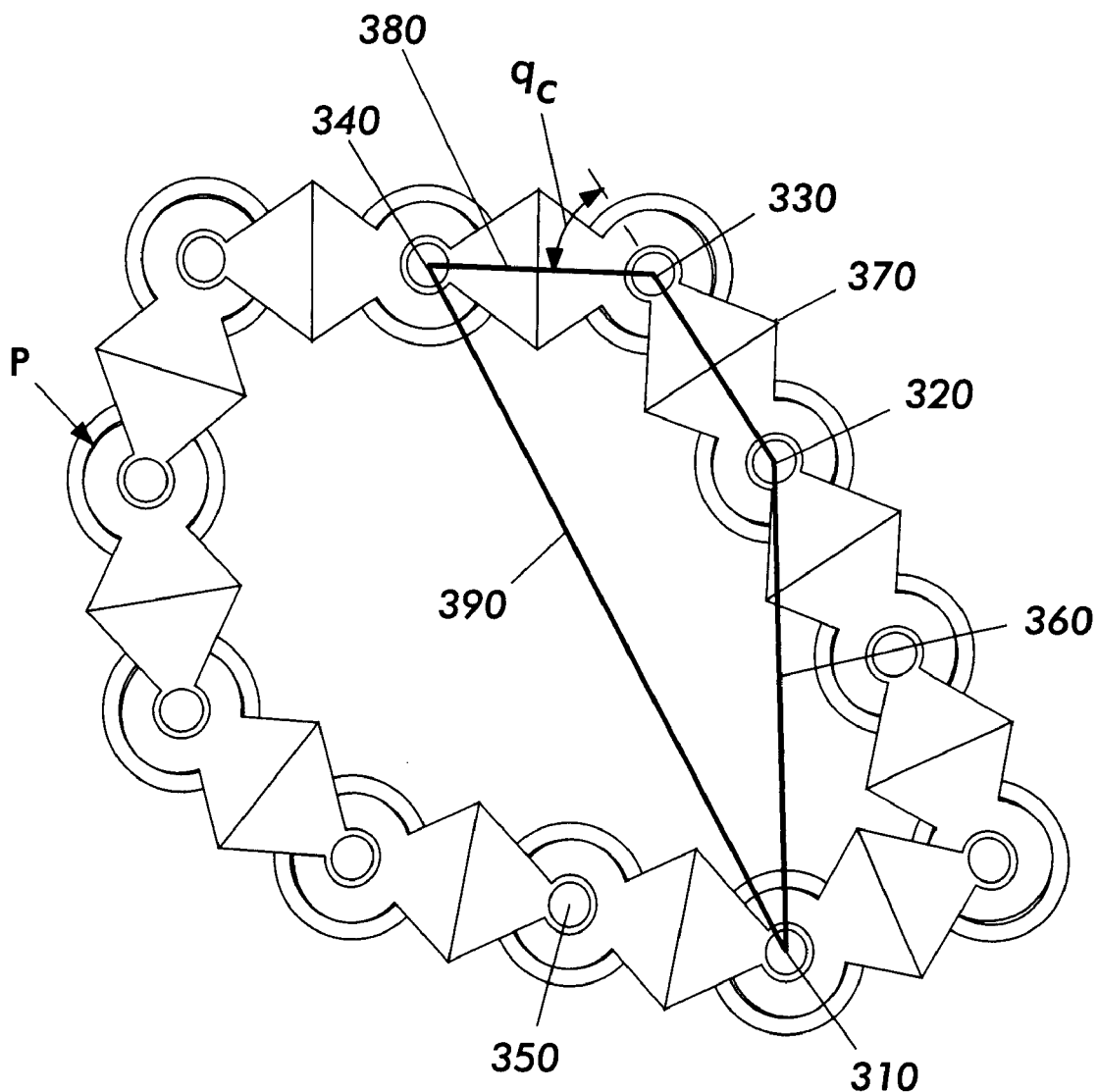
FIG. 3 is an illustration of a possible configuration produced using the modular joints disclosed herein.

Referring now to FIG. 3, there is shown a set of segment modules configured in a closed chain that moves in the plane of the page with external forces applied to it. The mechanical advantage of the different joints varies depending on the geometry of the configuration. From an initial configuration, it is possible to reach a goal configuration while maintaining actuator torque constraints by moving through a set of motions which alternately lock and release the joints. In this example, all modules are locked, except for joints 310, 320, 330 and 340. By locking all but four of the joints, the system can be viewed as a fourbar linkage having links 360, 370, 380, and 390 overlaid on the segment modules, with an external load applied at P.

For an output torque $T_o$ at target joint 310, and an input torque $T_i$ applied at one of the other three joints, for example joint 320, the mechanical advantage M can be expressed as $$M = T_o/T_i = -(\omega_i/\omega_o)$$

From the principle of virtual work, M is the negative reciprocal of the velocity ratio, input velocity $\omega_i$ over output velocity $\omega_o$. Since for this geometry the velocity $\omega_o$ is proportional to the sine of angle $q_c$, the angle between links 380 and 370, $\omega_o$ goes to zero as $q_c$ approaches zero.

M increases as joint 330 becomes straight and the three affected joints become co-linear. When $q_c=0$, the fourbar is in toggle, a point at which the configuration has infinite mechanical advantage. Also, at this point the Jacobian of the system is singular. For one DOF systems, the singularness corresponds to mechanical advantage.

In the fourbar example, the system has a single input and a single output. However many joints may apply forces as input. For the extreme condition in which actuators are at their limit, all the actuators may be considered as acting together as a virtual actuator, acting on the single DOF. While clamps and fixtures have infinite mechanical advantage at the singularity (one point in the configuration space) and very large mechanical advantage in a very small range near the singularity, it is desirable to obtain large mechanical advantages over a large range of motion.

Motions away from the singularity (for example joint 330 with $q_c$ close to 0 degrees, in a fourbar linkage moving away from 0 degrees) will cause a point P, where an external force is applied, to move in one direction, initially with infinite mechanical advantage. For the purposes herein, this is defined as a weakening move as the mechanical advantage starts high and becomes lower. Conversely, motions toward the singularity will cause P to move in the other direction with increasing mechanical advantage up to infinity as the singularity is reached. This is defined herein as a strengthening move. The resulting motion has a ratcheting effect. Each time 310 is locked, it has ratcheted a small amount of forward progress.

With the weakening move, the system begins with infinite mechanical advantage, so the joint can make some non-zero forward progress. However, after a weakening move, the strengthening move may not have a large enough mechanical advantage initially. If it is possible to calculate how much force is required to move P for a strengthening move, it is then necessary to insure that 330 never moves far enough from the singular position during the weakening move to lose enough mechanical advantage for the next strengthening move. Alternatively, the system can search for the appropriate positioning. If a strengthening move fails, the system can backtrack, losing some of the forward progress, but moving 330 closer to the singularity. This can be repeated until the strengthening move succeeds.

Figure 4:
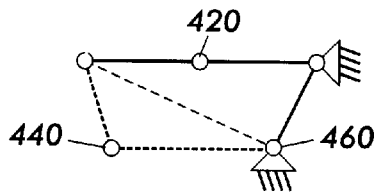
FIG. 4 is a schematic illustration of a first step in operation of the configuration of FIG. 3.
Figure 5:
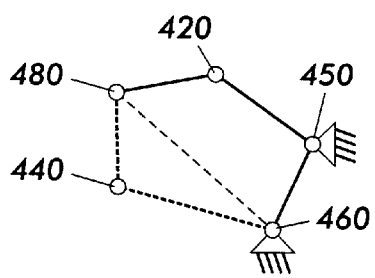
FIG. 5 is a schematic illustration of a second step in operation of the configuration of FIG. 3.
Figure 6:
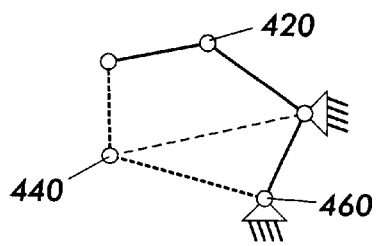
FIG. 6 is a schematic illustration of a third step in operation of the configuration of FIG. 3.
Figure 7:
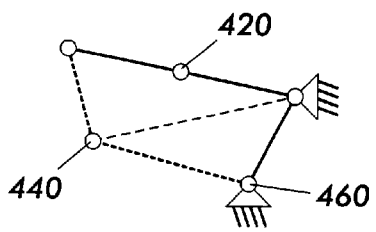
FIG. 7 is a schematic illustration of a fourth step in operation of the configuration of FIG. 3.

With these two motions, weakening and strengthening moves, and alternating which sets of joints are locked, a target joint 310 can theoretically be moved to any position with arbitrarily large mechanical advantage and arbitrarily weak motors, provided that the joints are arbitrarily strong and precise and friction is negligible. Referring now to FIG. 4, which schematically represents the active joints in FIG. 3, joints 460, 450, 420, 480 and 440 correspond to joints 310, 320, 330, 340 and 350 respectively. Note that the angle of joint 420 leaves the system in singularity. To move joint 460 to an arbitrarily more acute position, 460 is unlocked and joint 440 is locked. FIG. 5 is the result of a weakening move of joint 420, as joint 420 has moved away from the singularity. Moving slightly away from the toggle point or singularity reduces the mechanical advantage somewhat, depending on the distance from the toggle point. Joint 460 makes forward progress as joint 440 remains locked. With module joint 440 locked, the angle formed by the lines between joints 460, 440, and 440, 480 does not change, but all the other angles of the four bar linkage do change with the movement of module 420. Joint 460 is then locked and joint 440 is unlocked, as shown in FIG. 6. A strengthening move taking joint 420 back to singularity is then made and shown in FIG. 7. Here the system is resetting and no progress is made or lost as joint 460 is locked throughout the step. If joint 460 has reached the target position, then the ratcheting process is concluded; if joint 460 has not reached the target position, the steps are repeated, with each cycle of steps acting as one ratcheting motion.

To achieve the racheting action, the system emulates two different one DOF structural linkage mechanisms: one for the progress phase and one for the reset phase. Having two different locking states effectively emulates two different linkage mechanisms. Redundancy in the system allows the locking of joints without the loss of functionality. The closed chain configuration enables the system to support external forces without collapsing during the reset phase. Because this method exploits near infinite mechanical advantage M, configurations in the system with near infinite M are desirable. If the system is not already in singularity, the actuators may be strong enough initially to move to a singular configuration. Alternatively the links may be under external forces which push the system toward a singularity. Because of the plurality of joints in the system, it is often possible to select joints to meet one of these conditions.

Alternatively, a one-way ratcheting system, for example a roller-clutch stepless ratcheting system, a sawtooth and pawl ratchet, or directional braking could be implemented on joints 440 and 450 such that the angle formed by the lines joining modules 480, 460 and 460, 420 can only increase, thereby eliminating the need to actively lock and unlock the target module, in this case module 460. Any motion in the joints will result in progress. Dynamic motions may be used to increase the effectiveness.

Modular robotic systems with roller clutches can be used to reduce power consumption, as the roller clutch may passively maintain the position of the joints against external forces such as gravity. They may also aid in providing methods for motion when the actuators are not strong enough to apply sufficiently large forces. Any motion of the joint, for example through vibrations from dynamic motions or through active stimulation at a resonant frequency, will cause it to advance one way and not the other. This may be used even without a closed chain.

Figure 8:
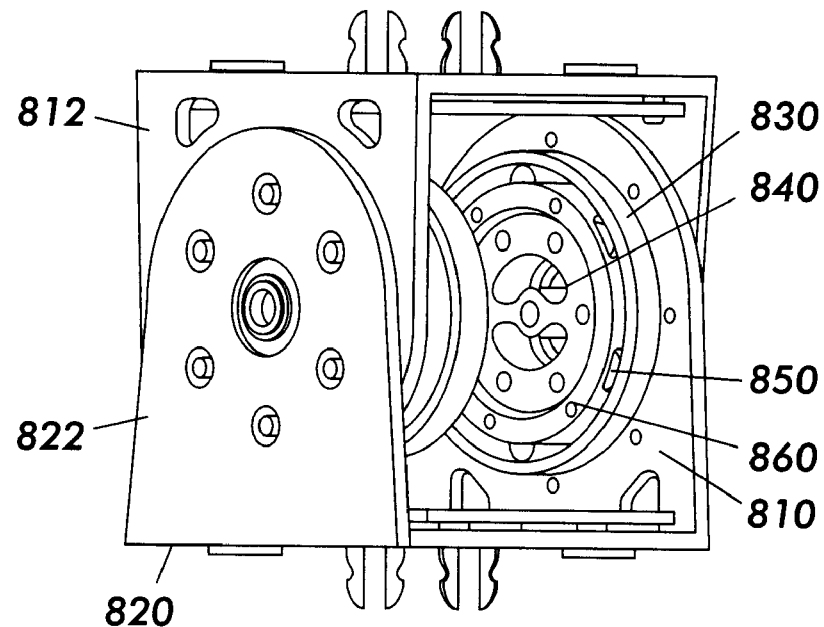
FIG. 8 illustrates another embodiment of the robotic module according to the instant invention.

An example of an embodiment having a controllable roller clutch ratchet is illustrated in FIG. 8. In this embodiment, connection plates 810 and 820 and structures 812 and 822 serve the same purpose and perform the same functions as connection plates 140 and 150 and structures 120 and 130 in FIG. 1. Rigidly attached to the inner wall of structure 822 is roller ratchet assembly outer cylinder 830. Inside roller ratchet assembly outer cylinder 830 is a lobed inner cylinder 840, which is rigidly attached to the inside of structure 812, holding rollers 850. Roller positioning frame 860 locks the lobed cylinder 840 and rollers 850 into place against the outer cylinder 830 which thus locks the structures 812 and 822.

Figure 9:
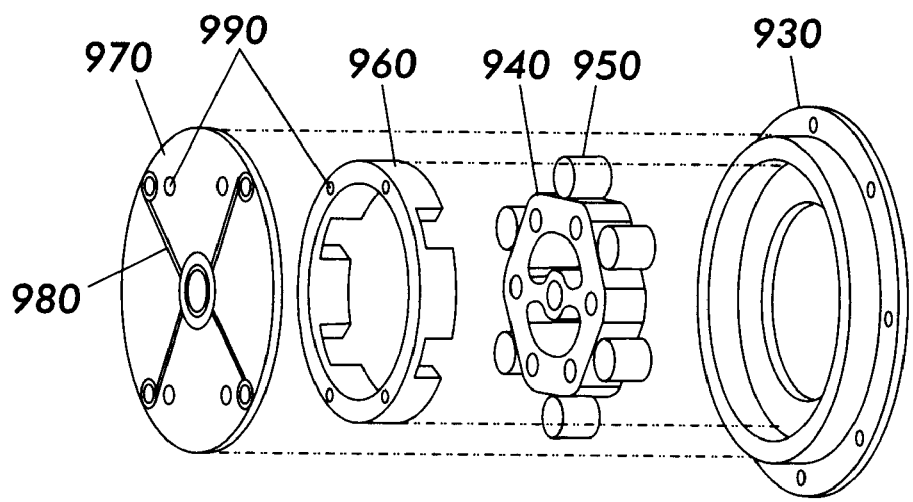
FIG. 9 is an exploded view of the embodiment of the robotic module according to FIG. 8.

Referring now to FIG. 9, there is shown an exploded pictorial of the roller ratchet assembly according to this embodiment. Outer cylinder 930, rollers 950, lobed inner cylinder 940, and roller positioning frame 960 serve the same purpose and perform the same function as items 830, 850, 840, and 860 respectively, of FIG. 8. The directionality of movement of the roller clutch ratchets may be controlled by a frame printed circuit board (pcb) 970 with shape memory actuator 980 (described in more detail hereinbelow), is structured to be mounted on roller positioning frame 960 via mounting holes 990.

Figure 10:
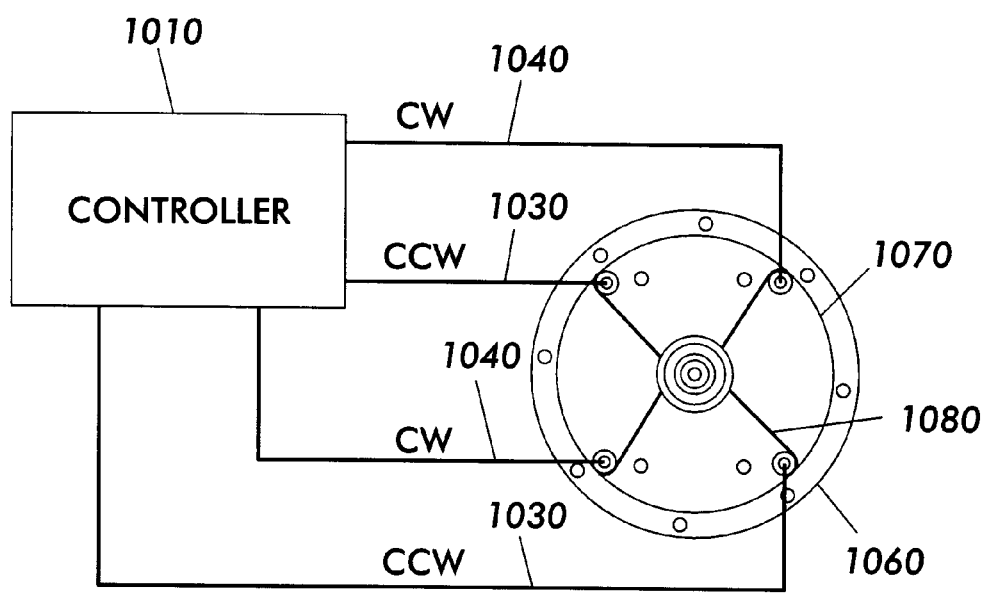
FIG. 10 is a schematic of the operation of the embodiment of the robotic module according to FIG. 8.

FIG. 10 illustrates the operation of the shape memory actuator of the roller ratchet assembly. When mounted with the lobed cylinder, rollers, and roller positioning frame (not shown) on roller ratchet outer assembly 1060, shape memory actuator 1080 on pcb 1070 is in communication with controller 1010.

Referring now to FIGS. 9 and 10, in operation, controller 1010 passes current through clockwise lines 1040 to actuate clockwise rotation of the positioning frame and counterclockwise lines 1030 to actuate counterclockwise rotation. When the shape memory actuators 1080 pull the positioning frame clockwise, the rollers 950 of FIG. 9 become jammed between the lobes of the lobed cylinder 940 and the outer cylinder 930 whenever the lobed cylinder rotates counterclockwise. Since the lobed cylinder 940, and the outer cylinder 930 are rigidly attached to structure 812 and 822, the structures will jam when rotated counterclockwise, thus allowing only clockwise rotation. The lobed cylinder 940 and thus structure 812 is free to rotate clockwise in this condition. When shape memory actuators 1080 pull the positioning frame 960 counterclockwise, the circumstance is reversed, and the lobed cylinder 940 becomes jammed when rotating clockwise, but is free to rotate counterclockwise. When the actuators 1080 are balanced, the rollers 950 are loose and will not jam either way.

While the present invention has been illustrated and described with reference to specific embodiments, further modification and improvements will occur to those skilled in the art. For example, the method described herein could be used beneficially with systems having prismatic as well as revolute joints, if the system is characterized by redundancy, contains a locking mechanism or brake on each DOF, is a closed chain configuration, and includes a configuration in which the Jacobian is singular. Other systems utilizing redundant parallel mechanisms similar to stewart platforms may also employ this method. It is to be understood, therefore, that this invention is not limited to the particular forms illustrated and that it is intended in the appended claims to embrace all alternatives, modifications, and variations which do not depart from the spirit and scope of this invention.

What is claimed is:

1. A controllable ratcheting apparatus having robotic modules rigidly attached for operation near a mechanical singularity, comprising:

a plurality of modular joints, wherein each one of said plurality of modular joints alternately locks and unlocks to effect performance of a ratcheting motion as said modular joint approaches a point of mechanical singularity;

a plurality of links movably connected to said modular joints, to permit movement of said links while experiencing large external forces as said modular joint approaches a point of mechanical singularity;

ratcheting means, wherein said ratcheting means comprises:

at least one pawl controllably attached to a first one of said plurality of links;

a first set of saw teeth rigidly attached to a second one of said plurality of links, for catching said pawl when said first set of saw teeth are rotated in a first direction;

a second pawl controllably attached to said first one of said plurality of links; and a second set of saw teeth rigidly attached to said second one of said plurality of links, for catching said second pawl when said second set of saw teeth are rotated in a second direction opposed to said first direction; and a control system to control movement of said modular joints and said links.

2. The ratcheting apparatus according to claim 1, wherein each said modular joint further comprises:

a drive device;

a housing; and an output shaft having an axis of rotation.

3. The ratcheting apparatus according to claim 1, wherein at least two said links are rigidly attached to each said modular joint.

4. The ratcheting apparatus according to claim 3, wherein said links comprise:

a first structure having at least one connection plate; and a second structure having at least one connection plate.

5. The ratcheting apparatus according to claim 4, wherein said first structure attaches rigidly to said housing.

6. The ratcheting apparatus according to claim 4, wherein said second structure attaches rigidly to said output shaft.

7. The ratcheting apparatus according to claim 4, wherein said links may move rotationally about said axis of said output shaft.

8. The ratcheting apparatus according to claim 1, wherein said ratcheting device comprises a roller clutch ratcheting system.

9. The ratcheting apparatus according to claim 1, wherein said ratcheting device comprises an active brake ratcheting system.

10. The ratcheting apparatus according to claim 1, wherein said plurality of links are connected to form at least one closed end chain.

11. The ratcheting apparatus according to claim 1, further comprising a plurality of sensors for sensing operation of said modular joints.

12. A controllable ratcheting apparatus having robotic modules configured in the form of a connected chain for operation near a mechanical singularity for obtaining large force over a specified distance, comprising:

a plurality of modular joints, wherein each one of said plurality of modular joints alternately locks and unlocks to effect performance of a ratcheting motion as said modular joint approaches a point of mechanical singularity;

a plurality of links movably connected to said modular joints, wherein said links are connected to form at least one closed end chain, to permit movement of said links while experiencing large external forces as said modular joint approaches a point of mechanical singularity;

ratcheting means, wherein said ratcheting means comprises:

at least one pawl controllably attached to a first one of said plurality of links;

a first set of saw teeth rigidly attached to a second one of said plurality of links, for catching said pawl when said first set of saw teeth are rotated in a first direction;

a second pawl controllably attached to said first one of said plurality of links; and a second set of saw teeth rigidly attached to said second one of said plurality of links, for catching said second pawl when said second set of saw teeth are rotated in a second direction opposed to said first direction; and a control system to control movement of said modular joints and said links.

13. The ratcheting apparatus according to claim 12, wherein each said modular joint further comprises:

a drive device;

a housing; and an output shaft having an axis of rotation.

14. The ratcheting apparatus according to claim 12, wherein at least two said links are rigidly attached to each said modular joint.

15. The ratcheting apparatus according to claim 14, wherein said links comprise:

a first structure having at least one connection plate; and a second structure having at least one connection plate.

16. The ratcheting apparatus according to claim 15, wherein said first structure attaches rigidly to said housing.

17. The ratcheting apparatus according to claim 15, wherein said second structure attaches rigidly to said output shaft.

18. The ratcheting apparatus according to claim 15, wherein said links may move rotationally about said axis of said output shaft.

19. The ratcheting apparatus according to claim 12, wherein said ratcheting device comprises a roller clutch ratcheting system.

20. The ratcheting apparatus according to claim 12, wherein said ratcheting device comprises an active brake ratcheting system.

21. The ratcheting apparatus according to claim 12, wherein said plurality of links are connected to form a closed end chain.

22. The ratcheting apparatus according to claim 12, further comprising a plurality of sensors.

* * * * *